G. W. SNIDER.
BEE-HIVES.
No. 185,194. Patented Dec. 12, 1876.
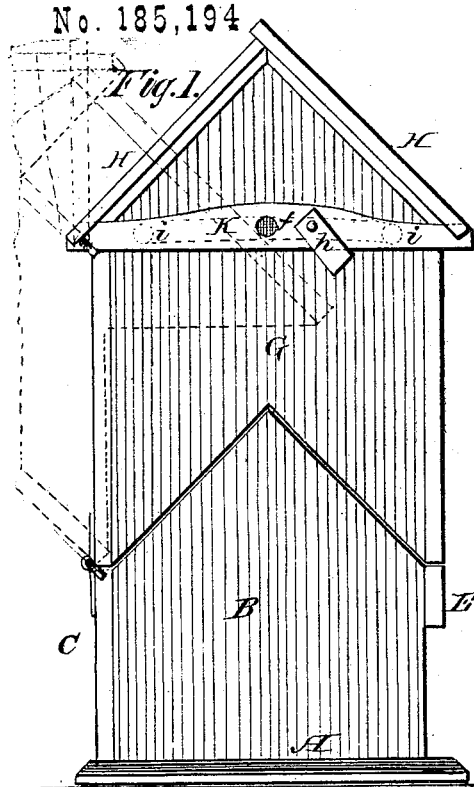
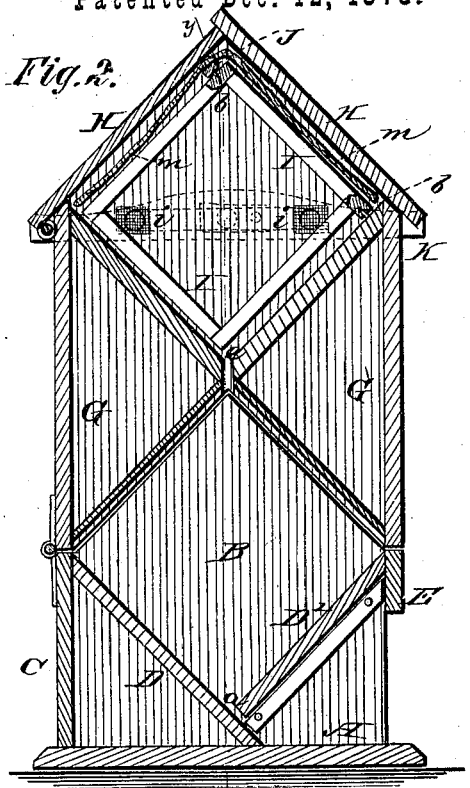
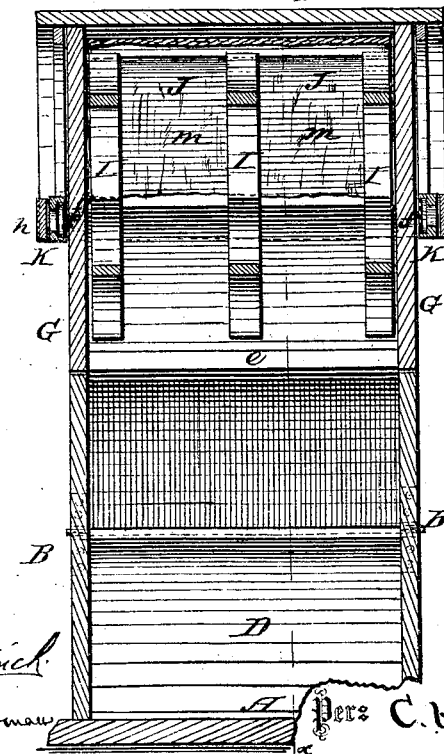
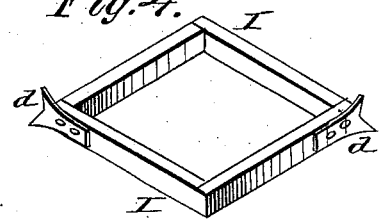

UNITED STATES PATENT OFFICE.

GEORGE W. SNIDER, OF DENISON, TEXAS.

IMPROVEMENT IN BEE-HIVES.

Specification forming part of Letters Patent No. 185,194, dated December 12, 1876; application filed October 9, 1876.

*To all whom it may concern:*

Be it known that I, GEORGE W. SNIDER, of Denison, in the county of Grayson and State of Texas, have invented certain new and useful Improvements in Bee-Hives; and I do hereby declare that the following is a full, clear, and exact description thereof, which will enable others skilled in the art to which it appertains to make and use the same, reference being had to the accompanying drawing, and to the letters of reference marked thereon, which form a part of this specification.

The nature of my invention consists in the construction and arrangement of a bee-hive, as will be hereinafter more fully set forth.

In the annexed drawing, Figure 1 is a side elevation of my bee-hive. Fig. 2 is a section of the same on the line $x\ x$, Fig. 3. Fig. 3 is a section on the line $y\ y$ of Fig. 2. Fig. 4 is a perspective view of one of the frames.

The base of my hive is composed of the bottom A, forming the alighting-board of the hive, and on which are secured the sides B B and back C. The upper portions of the sides B are V-shaped, running up to a central point, and the front edges of the side pieces are connected by a cross-bar, E, as shown. Between the side pieces B B are arranged two inclined boards, D D', standing at right angles with each other, forming the bottom of the lower chamber of the hive, and between said boards is the entrance $a$, as shown. G is the body of the hive, hinged to the back C, and constructed, as shown, to form the top of the lower chamber, and the bottom of the upper chamber of similar shape as the lower chamber, the hinged lid H forming the top of said upper chamber.

The sloping walls inside of the hive act as a self-cleaner, as all litter that may fall will finally land on the alighting-board outside. These sloping walls, as shown, also serve to concentrate the animal heat to the top and center, which is a great help to the bees, especially for small colonies, in generating wax, which, with a broad flat top, can only be done in very hot weather.

I represents the frame, constructed in diamond form, and supporting itself by having its two upper pieces extending about half an inch below the bottom pieces, giving room for the bees to pass under. The projecting ends of the top bars of the frames have wire pegs $b$ inserted in them to enter holes made for that purpose in the inclined walls of the bottom of the chamber, and the tops of the frames are connected by a cross-bar, J, having similar wire pegs, as shown in Fig. 2.

The frames as thus constructed I use principally in the upper chamber, while in the lower chamber I dispense with the cross-bar, and provide the frame on each side with a forked or pronged foot, $d$, as shown in Fig. 4. These feet hold the frames perfectly safe, and the frames can be adjusted at pleasure, as it is sometimes necessary to make the space betweeen them greater or smaller.

$e$ is an aperture leading from the bottom of the upper chamber into the lower one, as shown. On each side of the hinged top H is a cross-bar, K, with central ventilating-opening $f$, leading into a groove or passage on the inner side of said bar, and communicating with openings $i\ i$ into the hive. The opening $f$ is closed by means of a door, $h$, as shown, when desired. Over the top frames is placed a quilt, $m$, and over the bottom frames are to be placed two quilts, separated in the center to give room for the bees to pass through.

Having thus fully described my invention, what I claim as new, and desire to secure by Letters Patent, is—

The combination of the hive-body G with ventilating-openings $i\ i$, the hinged lid H, grooved cross-bars K, with opening $f$, and hinged door $h$, substantially as and for the purposes herein set forth.

In testimony that I claim the foregoing as my own I affix my signature in presence of two witnesses.

GEORGE W. SNIDER.

Witnesses:
 WILLIAM O'BRIEN,
 J. B. KELLY.